United States Patent
Hu et al.

(10) Patent No.: US 11,249,259 B2
(45) Date of Patent: Feb. 15, 2022

(54) OUTDOOR OPTICAL FIBER CONNECTOR

(71) Applicant: ROSENBERGER (SHANGHAI) TECHNOLOGY CO., LTD., Shanghai (CN)

(72) Inventors: Mingzhen Hu, Shanghai (CN); Daigen Chen, Shanghai (CN); Fang Ji, Shanghai (CN); Yi Zhang, Shanghai (CN)

(73) Assignee: ROSENBERGER (SHANGHAI) TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/998,109

(22) Filed: Aug. 20, 2020

(65) Prior Publication Data
US 2020/0386955 A1   Dec. 10, 2020

Related U.S. Application Data

(63) Continuation of application No. PCT/CN2018/080620, filed on Mar. 27, 2018.

(51) Int. Cl.
   *G02B 6/38* (2006.01)
(52) U.S. Cl.
   CPC ......... *G02B 6/3894* (2013.01); *G02B 6/3887* (2013.01)
(58) Field of Classification Search
   CPC .................................................. G02B 6/3894
   See application file for complete search history.

(56) References Cited

U.S. PATENT DOCUMENTS

| | | | |
|---|---|---|---|
| 6,577,794 B1 | 6/2003 | Currie et al. | |
| 8,814,442 B2 | 8/2014 | Chen et al. | |
| 2005/0238292 A1* | 10/2005 | Barnes | G02B 6/3846 385/78 |
| 2012/0155807 A1* | 6/2012 | Knapp | G02B 6/3853 385/61 |

FOREIGN PATENT DOCUMENTS

| | | | |
|---|---|---|---|
| CN | 101266322 A | | 9/2008 |
| CN | 104101954 A | | 10/2014 |
| CN | 104749711 A | | 7/2015 |
| CN | 204575902 U | * | 8/2015 |
| CN | 204575902 U | | 8/2015 |

OTHER PUBLICATIONS

English translation of CN204575902U by Google Patents (Year: 2015).*
International Search Report of PCT/CN2018/080620, dated Jan. 21, 2019.

* cited by examiner

*Primary Examiner* — Charlie Y Peng
(74) *Attorney, Agent, or Firm* — Locke Lord LLP; Tim Tingkang Xia, Esq.

(57) ABSTRACT

The invention discloses an outdoor optical fiber connector, which includes a female head flange assembly, a male head assembly, an insertion core fixing assembly and a docking assembly, and the docking assembly includes a pluggable locking member or a threaded locking member, and the female head flange assembly is provided with two docking structures respectively docked with the pluggable locking member and the threaded locking member. The connector of the invention provides multiple docking modes, meeting different installation requirements, and the connector is an ultra-small outdoor connector, having a compact overall space, and have a convenient and fast installation.

14 Claims, 6 Drawing Sheets

OUTDOOR OPTICAL FIBER CONNECTOR

CROSS REFERENCE TO RELATED APPLICATIONS

This application is a continuation of international application No. PCT/CN2018/080620, filed on Mar. 27, 2018, the disclosures of which are hereby incorporated by reference.

FIELD OF THE INVENTION

The present invention relates to an optical fiber connector, in particular to an outdoor optical fiber connector.

BACKGROUND

With continuous development of communication technologies, optical fiber communication is more widely used. Therefore, communication equipment is often connected with a communication optical fiber, and a device for realizing this connection (such as an outdoor optical fiber connector) directly affects a communication quality and a product cost, which has attracted extensive attention in the industry.

A traditional outdoor connector generally has the following disadvantages: 1. a single flange base assembly is only able to be provided with one thread locking member or one quickly pluggable locking member, which means that the traditional outdoor connector is unable to be compatibly matched and connected with both the threaded locking member and the quickly pluggable locking member, thus having a relatively single assembly mode; 2. a larger overall size of the connector requires a larger space for installation, which is not compact, and does not conform to a development direction of miniaturization of a connector; 3. the components of the connector are scattered, thus requiring many steps and a long time for installing a product, and being inconvenient in installation; and 4. a waterproof grade of the product is low and is unable to reach IP68.

SUMMARY OF THE INVENTION

The present invention is intended to overcome the defects in the prior art and provide an outdoor optical fiber connector having multiple docking modes, and convenient and fast installation.

In order to achieve the above objective, the present invention provides the following technical solution: An outdoor optical fiber connector, comprising a female head flange assembly, a male head assembly, at least two insertion core fixing assemblies and a docking assembly, wherein the female head flange assembly is docked with the male head assembly through the docking assembly, the docking assembly comprises a pluggable locking member or a threaded locking member, the female head flange assembly is provided with at least a first matching structure matched with the pluggable locking member and a second matching structure matched with the threaded locking member, and the female head flange assembly is docked with the male head assembly through matchment between the first matching structure and the pluggable locking member or matchment between the second matching structure and the threaded locking member; and the female head flange assembly and the male head assembly are respectively internally provided with at least one insertion core fixing assembly, and after the female head flange assembly is docked with the male head assembly, the insertion core fixing assembly in the female head flange assembly and the insertion core fixing assembly in the male head assembly are also docked.

Preferably, the female head flange assembly comprises a flange base and a female head locking member for locking and fixing the insertion core fixing assembly in the flange base, one end of the flange base is connected with the male head assembly through the docking assembly, and the other end of the flange base is connected with the female head locking member.

Preferably, the first matching structure and the second matching structure are arranged on the flange base, the first matching structure is a female head bulge matched and connected with the pluggable locking member, and the second matching structure is an external thread matched and connected with the threaded locking member.

Preferably, the male head assembly comprises a tail pipe, a crimping assembly and a connecting shell, the crimping assembly is arranged in the tail pipe and fixedly connected with one end of the connecting shell for crimping and fixing the insertion core fixing assembly in the connecting shell, and the other end of the connecting shell is connected with the female head flange assembly through the docking assembly.

Preferably, the crimping assembly comprises a crimping ring and a crimping body, the crimping ring is tightly pressed in the tail pipe, one end of the crimping body extends into and is tightly pressed in the crimping ring, and the other end of the crimping body is connected with the connecting shell.

Preferably, the crimping body is threadedly connected with the connecting shell through a fixing nut, and the fixing nut is positioned in the tail pipe.

Preferably, wherein the pluggable locking member comprises a pluggable locking part and a pluggable unlocking part, the pluggable locking part is tightly pressed and fixed to one end of the male head assembly, and the pluggable unlocking part is arranged on the pluggable locking part and moves back and forth relative to the pluggable locking part, and the pluggable locking part is locked to or unlocked from the female head flange assembly under driving of the pluggable unlocking part.

Preferably, wherein the threaded locking member is fixedly connected with one end of the male head assembly and is in threaded locking connection with one end of the female head flange assembly.

Preferably, the threaded locking member is fixedly connected with the male head assembly through a C-shaped ring.

Preferably, a sealing ring is arranged between the crimping ring and the connecting shell, and a sealing ring is arranged between the connecting shell and the female head flange assembly.

Preferably, a groove for being matched with the C-shaped ring is arranged between the male head assembly and the threaded locking member, and the C-shaped ring is installed in the groove.

Preferably, an aramid fiber or a glass yarn is arranged between the crimping ring and the crimping body, and the crimping ring and the crimping body jointly crimp the insertion core fixing assembly.

Preferably, each insertion core fixing assembly comprises an insertion core fixing member and a U-shaped card, a card slot is radially arranged on a surface of the insertion core fixing member, the card slot is closed to one end portion of the insertion core fixing member, and the card slot is for the U-shaped card inserting into to clamp optical fiber insertion cores to the insertion core fixing member.

Preferably, the connecting shell is provided with a positioning guide hole, the insertion core fixing member is provided with a guide bulge matched with the positioning guide hole, and the positioning guide hole and the guide bulge are matched to form a guide pin.

Preferably, the insertion core fixing assembly in the male head assembly and the insertion core fixing assembly in the female head flange assembly are symmetrically arranged.

The present invention has the beneficial effects as follows.

1. The female head flange assembly is provided with an external thread and a female head bulge, so that the female head flange assembly can be docked with a threaded locking member or a pluggable locking member through the external thread and the female head bulge respectively, so that the female head flange assembly can be matched with a male head assembly through the threaded locking member or the pluggable locking member, so that the present invention is more flexible in selection and can meet different requirements of a customer.

2. The present invention has an extremely high waterproof/dustproof function and is able to be applied to an outdoor environment, reaching an IP68 grade in water and dust prevention.

3. The present invention is an ultra-small outdoor connector and has a compact overall space, thus solving problems such as a large product volume influences on installation space and use space, and the like.

4. A metal shell is used to cover main components of a product, thus having a stable mechanical property.

5. The connector is entirely miniaturized, so that the diameter of a male head assembly and the diameter of a female head flange assembly are both reduced, and the size of a corresponding optical cable is correspondingly reduced, thus reducing the cost of the optical cable and saving installation time.

6. The male head assembly only needs to be integrally and threadedly connected with the female head flange assembly, or integrally and quickly plugged into the female head flange assembly during installation, so that the connector of the present invention has convenient and fast installation.

REFERENCE NUMERALS

Figure 1:
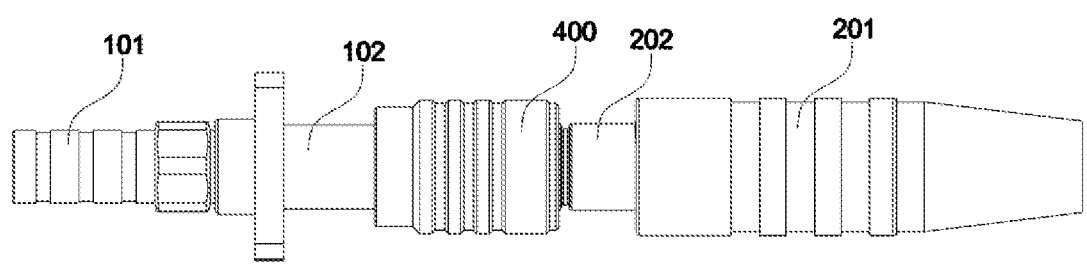
FIG. 1 is a structure diagram of a female head flange assembly and a male head assembly with a pluggable locking member of the present invention.

100 refers to female head flange assembly, 101 refers to female head locking member, 102 refers to flange base, 103 refers to external thread, 104 refers to female head bulge, 105 refers to U-shaped groove, 200 refers to male head assembly, 201 refers to tail pipe, 202 refers to connecting shell, 203 refers to crimping ring, 204 refers to crimping body, 205 refers to fixing nut, 206 refers to C-shaped ring, 207 refers to groove, 208 refers to U-shaped groove, 209 refers to through hole, 210 refers to positioning guide hole, 300 refers to insertion core fixing assembly, 301 refers to insertion core fixing member, 302 refers to U-shaped card, 303 refers to fixing hole, 304 refers to card slot, 305 refers to head end, 306 refers to tail end, 307 refers to bulge, 308 refers to guide bulge, 400 refers to pluggable locking member, 401 refers to pluggable locking part, 402 refers to pluggable unlocking part, 403 refers to groove, 500 refers to threaded locking member, 501 refers to groove, 502 refers to internal thread, 600 refers to sealing ring, and 700 refers to optical fiber insertion core.

DETAILED DESCRIPTION OF THE PREFERRED EMBODIMENTS

The technical solutions of the embodiments of the present invention are clearly and completely described hereinafter with reference to the accompanying drawings of the present invention.

An outdoor optical fiber connector disclosed by the present invention provides a pluggable docking mode and a threaded docking mode, which may be flexibly selected according to different installation requirements; and the connector is an ultra-small outdoor connector, having a compact overall space and a stable mechanical property, meeting a requirement of an IP68 grade in water and dust prevention, and having convenient and fast installation.

With reference to FIG. 1 to FIG. 4, an outdoor optical fiber connector disclosed by the present invention includes a female head flange assembly 100, a male head assembly 200, two insertion core fixing assemblies 300 and a docking assembly. The docking assembly includes both a pluggable locking member 400 and a threaded locking member 500, and the female head flange assembly 100 is provided with two docking structures respectively docked with the pluggable locking member 400 and the threaded locking member 500, so that the female head flange assembly 100 can be matched with the male head assembly 200 through the pluggable locking member 400, and also can be matched with the male head assembly 200 through the threaded locking member 500. The female head flange assembly 100 and the male head assembly 200 are internally provided with at least one insertion core fixing assembly 300 respectively, and after the female head flange assembly 100 is being docked with the male head assembly 200, the insertion core fixing assembly 300 in the female head flange assembly 100 and the insertion core fixing assembly 300 in the male head assembly 200 are also docked.

Figure 2:
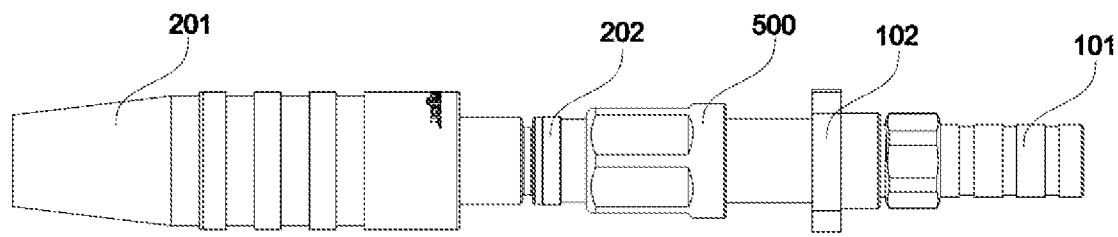
FIG. 2 is a structure diagram of a female head flange assembly and a male head assembly with a threaded locking member of the present invention.
Figure 3:
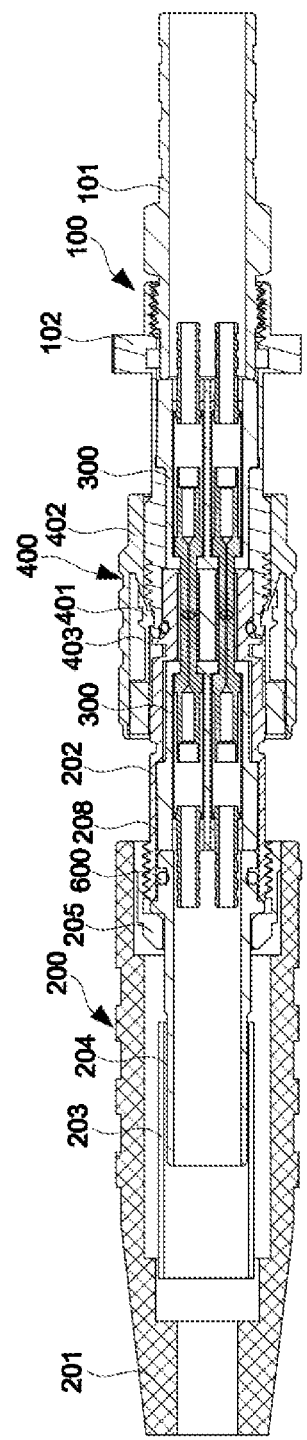
FIG. 3 is a cross-sectional structure diagram of FIG. 1.
Figure 5:
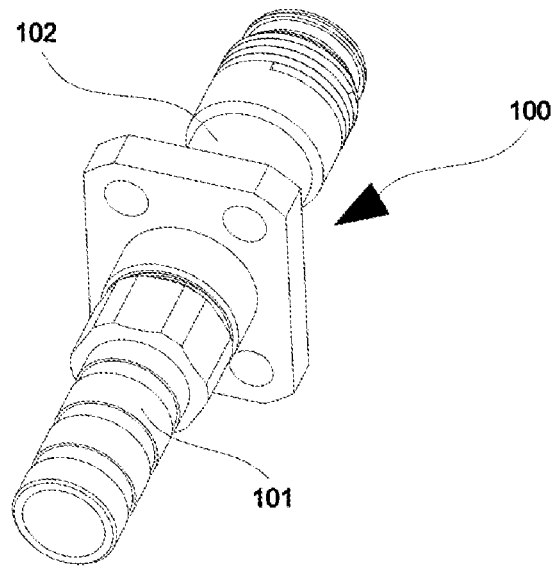
FIG. 5 is a structure diagram of a female head flange assembly of the present invention.

Specifically, in the embodiment, with reference to FIG. 2, FIG. 3 and FIG. 5, the female head flange assembly 100 includes a female head locking member 101 and a flange base 102, wherein one end of the female head locking member 101 is a free end, and the other end of the female head locking member 101 extends into the flange base 102, and the female head locking member 101 is in threaded locking connection with the flange base 102, so that the female head flange assembly 100 is integrally connected. Moreover, when the female head locking member 101 is locked with the flange base 102, an end portion of the female head locking member 101 extending into the flange base 102 abuts against an end portion of the insertion core fixing assembly 300 for tightly pressing the insertion core fixing assembly 300 in the flange base 102.

Figure 6:
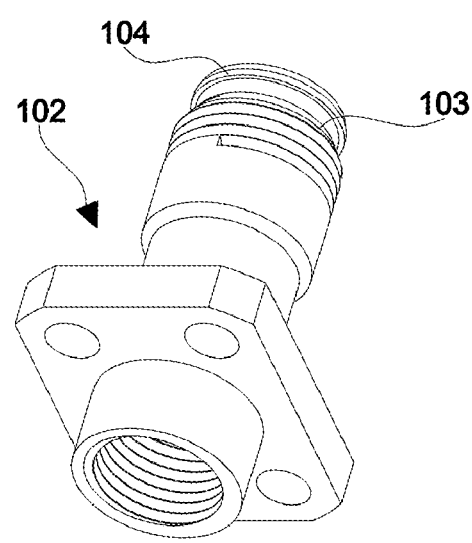
FIG. 6 is a structure diagram of a flange base of the present invention.

The other end of the flange base 102 is connected with the docking assembly. In the embodiment, the docking assembly is the threaded locking member 500 or the pluggable locking member 400. When the docking assembly is the threaded locking member 500, the female head flange assembly 100 is matched with the male head assembly 200 through the threaded locking member 500. When the docking assembly is the pluggable locking member 400, the female head flange assembly 100 is matched with the male head assembly 200 through the pluggable locking member 400. In the embodiment, with reference to FIG. 6, an outer surface of the other end of the flange base 102 is provided with both an external thread 103 and a female head bulge 104, wherein the external thread 103 is a second docking structure for matching with the thread locking member 500, and the female head bulge 104 is a first docking structure for matching with the pluggable locking member 400.

Figure 4:
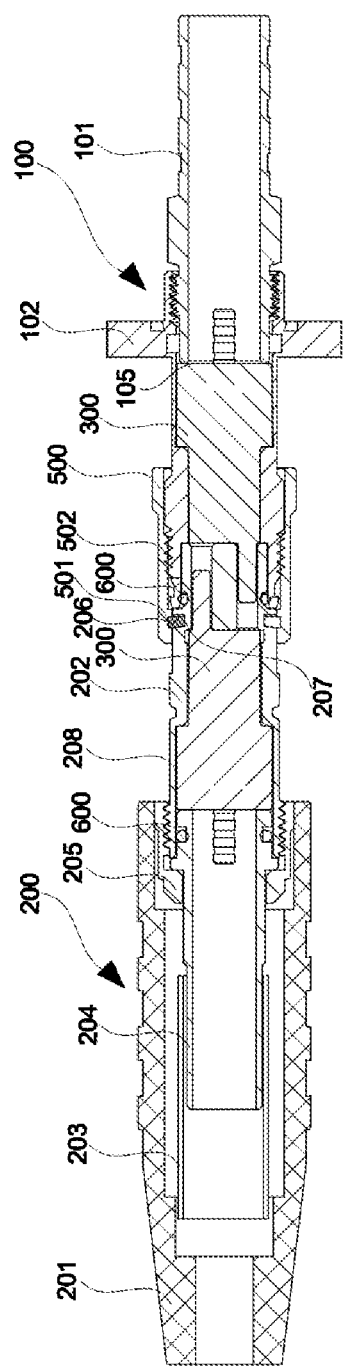
FIG. 4 is a cross-sectional structure diagram of FIG. 2.

With reference to FIG. 3 and FIG. 4, the male head assembly 200 specifically includes a tail pipe 201, a crimping assembly and a connecting shell 202. The crimping assembly is arranged in the tail pipe 201, and includes a crimping ring 203 and a crimping body 204, wherein the crimping ring 203 is tightly pressed in the tail pipe 201, one end of the crimping body 204 extends into and is tightly pressed in the crimping ring 203, and the other end of the crimping body 204 is connected with the connecting shell 202. Preferably, an aramid fiber or a glass yarn (not shown) is arranged between the crimping ring 203 and the crimping body 204, and the crimping ring 203 and the crimping body 204 jointly crimp the insertion core fixing assembly 300, so that the outdoor connector is tightly connected with an optical cable, thus meeting a pulling force requirement of the outdoor connector.

With reference to FIG. 3 and FIG. 4, one end of the connecting shell 202 is connected with the crimping body 204. In the embodiment, one end of the connecting shell 202 is threadedly connected with the crimping body 204 through a fixing nut 205, the fixing nut 205 is positioned in the tail pipe 201 and is threadedly connected with the crimping body 204, and one end of the connecting shell 202 is threadedly connected with the fixing nut 205, so that the male head assembly 200 is integrally connected. The other end of the connecting shell 202 is connected with the flange base 102 of the female head flange assembly 100 through the threaded locking member 500 or the pluggable locking member 400. The connecting shell 202 can be a ceramic cylinder during implementation.

Figure 8:
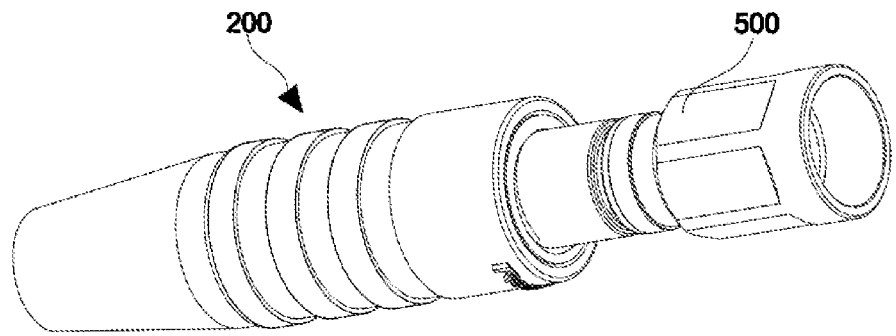
FIG. 8 is a structure diagram of a threadedly locked male head assembly of the present invention.

When the other end of the connecting shell 202 is connected with the flange base 102 through the threaded locking member 500, in the embodiment, as shown in FIG. 4, the other end of the connecting shell 202 is connected with the threaded locking member 500 as a whole through a C-shaped ring 206, and a formed integral structure is defined as a threadedly locked male head assembly as shown in FIG. 8. Specifically, an outer surface of the connecting shell 202 is provided with groove 207, and an inner surface of the threaded locking member 500 is provided with groove 501, and the grooves 207 and 501 are used for being matched with the C-shaped ring 206. The C-shaped ring 206 is installed in the groove 207 in the outer surface of the connecting shell 202, and a portion thereof protruding from the groove 207 is engaged with the groove 501 in the inner surface of the threaded locking member 500. The threaded locking member 500 and the flange base 102 are fixedly connected through a structure that an internal thread is matched with an external thread, which means that the inner surface of the threaded locking member 500 is provided with the internal thread 502 matched with the external thread 103 of the flange base 102. In this way, when the male head assembly 200 is locked to the female head flange assembly 100, the threaded locking member 500 is rotationally locked towards a direction close to the flange base 102, so that the male head assembly 200 and the female head flange assembly 100 are locked firmly. On the contrary, the threaded locking member 500 is rotationally unlocked towards a direction away from the flange base 102, so that the male head assembly 200 is removed from the female head flange assembly 100. The threaded locking member 500 can be a nut, and the C-shaped ring 206 can be a C-shaped metal ring during implementation.

Figure 9:
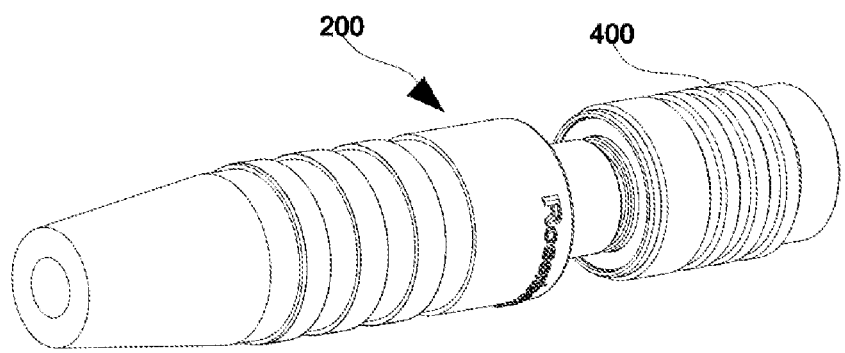
FIG. 9 is a structure diagram of a pluggablely locked male head assembly of the present invention.

When the other end of the connecting shell 202 is connected with the flange base 102 through the pluggable locking member 400, in the embodiment, as shown in FIG. 3, the pluggable locking member 400 includes a pluggable locking part 401 and a pluggable unlocking part 402. The pluggable locking part 401 is crimped and fixed to the other end of the connecting shell 202, and an inner surface of the pluggable locking part 401 is provided with a groove 403 matched with the female head bulge 104 on the flange base 102. The pluggable unlocking part 402 is arranged on the pluggable locking part 401 by using a thin-wall back-pressure process, so that the pluggable unlocking part 402 may move back and forth in an axial direction without falling out of the pluggable locking part 401. After the connecting shell 202 and the pluggable locking member 400 are assembled, a formed integral structure is defined as a pluggablely locked male head assembly as shown in FIG. 9. When the male head assembly 200 and the female head flange assembly 100 are being docked, the pluggable unlocking part 402 pushes the pluggable locking part 401 towards a direction close to the flange base 102, so that the female head bulge 104 on the flange base 102 is clamped into the groove 403 of the pluggable locking part 401, thus locking the female head flange assembly 100 and the male head assembly 200 by plugging to meet a mechanical pulling force requirement. On the contrary, the pluggable unlocking part 402 pulls the pluggable locking part 401 towards a direction away from the flange base 102, so that the female head bulge 104 on the flange base 102 is separated from the groove 403 of the pluggable locking part 401, thus removing the male head assembly 200 from the female head flange assembly 100, and completing unlocking. Therefore, the installation of the connector is convenient and fast.

Figure 10:
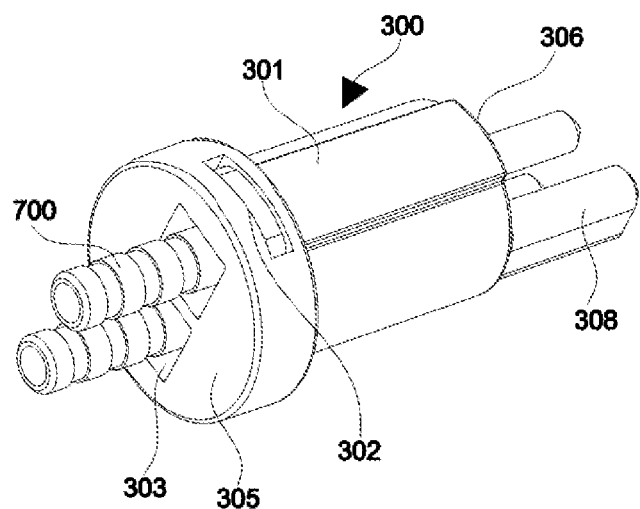
FIG. 10 is a structure diagram of an insertion core fixing assembly of the present invention.
Figure 11:
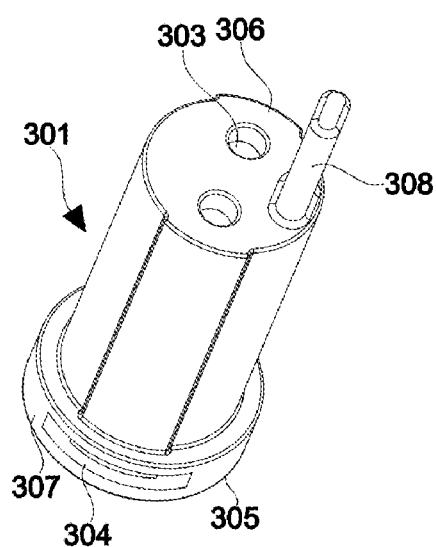
FIG. 11 is a structure diagram of an insertion core fixing member of the present invention.

With reference to FIG. 10 and FIG. 11, in the embodiment, each insertion core fixing assembly 300 specifically includes an insertion core fixing member 301 and a U-shaped card 302. The U-shaped card 302 is used for fixing two optical fiber insertion cores 700 to the insertion core fixing member 301, which means that the outdoor optical fiber connector of the present invention is a 2-core optical fiber connector. Therefore, the insertion core fixing member 301 is provided with two fixing holes 303 penetrating axially, and the two optical fiber insertion cores 700 penetrate into the corresponding fixing holes 303, and each optical fiber insertion core 700 tightly press spring (not shown) in the fixing hole 303 to be stressed. A card slot 304 is radially arranged on a surface of the insertion core fixing member 301, and the card slot 304 is closed to one end portion of the insertion core fixing member 301, and the card slot 304 is for the U-shaped card 302 inserting into to clamp the two optical fiber insertion cores to the insertion core fixing member 301. The insertion core fixing assembly 300 assembled with the optical fiber insertion cores 700 and the U-shaped card 302 is as shown in the drawing. The U-shaped card 302 can be a U-shaped metal card during implementation.

With reference to FIG. 3 and FIG. 4, in the embodiment, the female head flange assembly 100 and the male head assembly 200 are respectively internally provided with the insertion core fixing assembly 300, and the two insertion core fixing members 301 of the two insertion core fixing assemblies 300 are docked with each other. Each insertion core fixing member 301 is defined to have a head end 305 and a tail end 306 opposite to each other, the two tail ends 305 of the two insertion core fixing members 301 are docked with each other, and the fixing holes 303 of the two insertion core fixing members 301 are also corresponding to each other to allow the two optical fiber insertion cores 700 to pass through. One insertion core fixing member 301 is fixed in the connecting shell 202, and the other insertion core fixing member 301 is fixed in the flange base 102. The two insertion core fixing members 301 are respectively connected with the connecting shell 202 and the flange base 102 through a structure that a bulge is matched with a groove. Specifically, a bulge 307 is circumferentially arranged on a surface of the insertion core fixing member 301, and U-shaped grooves 208 and 105 are respectively machined and cut in the connecting shell 202 and the flange base 102, and the U-shaped grooves 208 and 105 are respectively matched with the bulges 307 of the corresponding insertion core fixing members 301.

Figure 7:
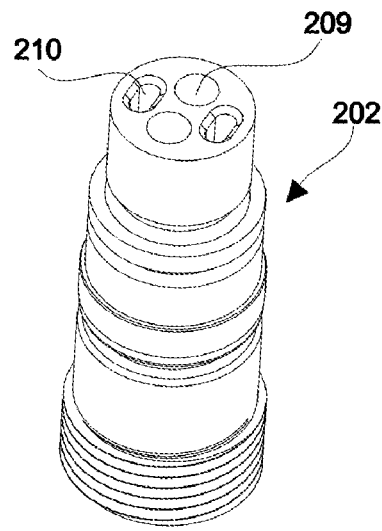
FIG. 7 is a structure diagram of a connecting shell of the present invention.

In addition, in the embodiment, with reference to FIG. 7, an end portion of the connecting shell 202 connected with the flange base 102 is also provided with two through holes 209 for the optical fiber insertion cores 700 to pass through and two positioning guide holes 210 used for positioning and guiding. A tail end 306 of the insertion core fixing member 301 is provided with guide bulge 308 matched with the positioning guide hole 210 in the connecting shell 202. The guide bulge 308 of the insertion core fixing member 301 is inserted into the positioning guide hole 210 of the connecting shell 202 during installation, and the guide bulge 308 and the positioning guide hole 210 form guide pins and have positioning and anti-rotation functions. In the embodiment, a cross section of the positioning guide hole 210 is oval, and a cross section of the guide bulge 308 is oval correspondingly.

The insertion core fixing assembly 300 in the male head assembly 200 and the insertion core fixing assembly 300 in the female head flange assembly 100 are symmetrically arranged, so that when the male head assembly 200 and the female head flange assembly 100 are being docked, the optical fiber insertion cores 700 can be smoothly docked in the connecting shell 202.

Preferably, with reference to FIG. 3 and FIG. 4, a sealing ring 600 is arranged between the connecting shell 202 and the crimping body 204, and a sealing ring 600 is arranged between the connecting shell 202 and the flange base 102. A structure of the sealing ring 600 may ensure that a product may be used in a severe outdoor environment for a long time, reaching an IP68 grade in water/dust prevention.

Preferably, the tail pipe 201 can be a rubber tail pipe, which protects a root portion of the optical cable and prevents damage to a bent optical cable core.

Preferably, a metal shell is used in all main components of the connector of the present invention (including the crimping assembly, the fixing nut 205, the connecting shell 202, the threaded locking member 500, the pluggable locking member 400, and the flange base 102), with a stable mechanical property.

The threadedly locked male head assembly can be screwed and fixed to the female head flange assembly 100 during docking, or the pluggablely locked male head assembly can be plugged into the female head flange assembly 100, thus having convenient and fast installation.

The technical contents and technical features of the present invention have been disclosed above. However, those skilled in the art may still make various substitutions and modifications without departing from the spirit of the present invention based on the teaching and disclosure of the present invention. Therefore, the scope of protection of the present invention should not be limited to the contents disclosed in the embodiments, but should include various substitutions and modifications without departing from the present invention and be covered by the claims of the patent application.

The invention claimed is:

1. An outdoor optical fiber connector, comprising:
a female head flange assembly,
a male head assembly,
at least two insertion core fixing assemblies, and
a docking assembly,
wherein the female head flange assembly is docked with the male head assembly through the docking assembly, the docking assembly comprises a pluggable locking member or a threaded locking member, the female head flange assembly is provided with at least a first matching structure matched with the pluggable locking member and a second matching structure matched with the threaded locking member, and the female head flange assembly is docked with the male head assembly through matchment between the first matching structure and the pluggable locking member or matchment between the second matching structure and the threaded locking member; and the female head flange assembly and the male head assembly are respectively internally provided with at least one insertion core fixing assembly, and after the female head flange assembly is docked with the male head assembly, the insertion core fixing assembly in the female head flange assembly and the insertion core fixing assembly in the male head assembly are also docked, and the threaded locking member is fixedly connected with one end of the male head assembly and is in threaded locking connection with one end of the female head flange assembly.

2. The outdoor optical fiber connector according to claim 1, wherein the female head flange assembly comprises a flange base and a female head locking member for locking and fixing the insertion core fixing assembly in the flange base, one end of the flange base is connected with the male head assembly through the docking assembly, and the other end of the flange base is connected with the female head locking member.

3. The outdoor optical fiber connector according to claim 2, wherein the first matching structure and the second matching structure are arranged on the flange base, the first matching structure is a female head bulge matched and connected with the pluggable locking member, and the second matching structure is an external thread matched and connected with the threaded locking member.

4. The outdoor optical fiber connector according to claim 1, wherein the male head assembly comprises a tail pipe, a crimping assembly and a connecting shell, the crimping assembly is arranged in the tail pipe and fixedly connected with one end of the connecting shell for crimping and fixing the insertion core fixing assembly in the connecting shell, and the other end of the connecting shell is connected with the female head flange assembly through the docking assembly.

5. The outdoor optical fiber connector according to claim 4, wherein the crimping assembly comprises a crimping ring and a crimping body, the crimping ring is tightly pressed in the tail pipe, one end of the crimping body extends into and is tightly pressed in the crimping ring, and the other end of the crimping body is connected with the connecting shell.

6. The outdoor optical fiber connector according to claim 5, wherein the crimping body is threadedly connected with the connecting shell through a fixing nut, and the fixing nut is positioned in the tail pipe.

7. The outdoor optical fiber connector according to claim 1, wherein the pluggable locking member comprises a pluggable locking part and a pluggable unlocking part, the pluggable locking part is tightly pressed and fixed to one end of the male head assembly, and the pluggable unlocking part is arranged on the pluggable locking part and moves back and forth relative to the pluggable locking part, and the pluggable locking part is locked to or unlocked from the female head flange assembly under driving of the pluggable unlocking part.

8. The outdoor optical fiber connector according to claim 1, wherein the threaded locking member is fixedly connected with the male head assembly through a C-shaped ring.

9. The outdoor optical fiber connector according to claim 5, wherein a sealing ring is arranged between the crimping ring and the connecting shell, and a sealing ring is arranged between the connecting shell and the female head flange assembly.

10. The outdoor optical fiber connector according to claim 8, wherein a groove for being matched with the C-shaped ring is arranged between the male head assembly and the threaded locking member, and the C-shaped ring is installed in the groove.

11. The outdoor optical fiber connector according to claim 5, wherein an aramid fiber or a glass yarn is arranged between the crimping ring and the crimping body, and the crimping ring and the crimping body jointly crimp the insertion core fixing assembly.

12. The outdoor optical fiber connector according to claim 1, wherein each insertion core fixing assembly comprises an insertion core fixing member and a U-shaped card, a card slot is radially arranged on a surface of the insertion core fixing member, the card slot is closed to one end portion of the insertion core fixing member, and the card slot is for the U-shaped card inserting into to clamp optical fiber insertion cores to the insertion core fixing member.

13. The outdoor optical fiber connector according to claim 4, wherein the connecting shell is provided with a positioning guide hole, the insertion core fixing member is provided with a guide bulge matched with the positioning guide hole, and the positioning guide hole and the guide bulge are matched to form a guide pin.

14. The outdoor optical fiber connector according to claim 1, wherein the insertion core fixing assembly in the male head assembly and the insertion core fixing assembly in the female head flange assembly are symmetrically arranged.

* * * * *